United States Patent
Nakamura et al.

(10) Patent No.: US 9,470,590 B2
(45) Date of Patent: Oct. 18, 2016

(54) COIL SPRING MODELING APPARATUS

(71) Applicants: NHK SPRING CO., LTD., Yokohama-shi, Kanagawa (JP); NHK INTERNATIONAL CORPORATION, Wixom, MI (US)

(72) Inventors: Takahiro Nakamura, Yokohama (JP); Kazuo Furukawa, Machida (JP); Senri Moriyama, Yokohama (JP); Ryuichi Sato, Yokohama (JP); Shinichi Nishizawa, Walled Lake, MI (US)

(73) Assignees: NHK SPRING CO., LTD., Kanagawa (JP); NHK INTERNATIONAL CORPORATION, Wixom, MI (US)

( * ) Notice: Subject to any disclaimer, the term of this patent is extended or adjusted under 35 U.S.C. 154(b) by 15 days.

(21) Appl. No.: 14/620,795

(22) Filed: Feb. 12, 2015

(65) Prior Publication Data

US 2016/0238473 A1 Aug. 18, 2016

(51) Int. Cl.
*G01N 3/08* (2006.01)
*G01L 5/00* (2006.01)
*F16F 1/04* (2006.01)

(52) U.S. Cl.
CPC . *G01L 5/00* (2013.01); *F16F 1/04* (2013.01); *F16F 2230/0017* (2013.01)

(58) Field of Classification Search
CPC ............ G01N 3/08; G01N 3/36; G01B 5/30
USPC ................. 73/818, 788, 760, 790, 789, 813
See application file for complete search history.

(56) References Cited

U.S. PATENT DOCUMENTS

| 7,606,690 B2 | 10/2009 | Nishizawa et al. | |
| 8,214,184 B2 * | 7/2012 | Nishizawa | B60G 11/15 267/166 |
| 2003/0111309 A1 * | 6/2003 | Nishizawa | G09B 23/08 188/299.1 |

FOREIGN PATENT DOCUMENTS

| JP | 05281096 A | 10/1993 |
| JP | 2007256019 A | 10/2007 |

OTHER PUBLICATIONS

Nishizawa, et al., "Experimental Study on the Effect of Coil Spring Reaction Force Vector on McPherson Strut Suspension Characteristics", SAE 2014 World Congress & Exhibition, published Apr. 1, 2014, pp. 1-6.

(Continued)

*Primary Examiner* — Lisa Caputo
*Assistant Examiner* — Nigel Plumb
(74) *Attorney, Agent, or Firm* — Holtz, Holtz & Volek PC

(57) ABSTRACT

A coil spring modeling apparatus includes an actuator unit formed of a Stewart-platform-type parallel mechanism, a first inner load cell accommodated in a first attachment member, a second inner load cell accommodated in a second attachment member, and a rotation support mechanism. The actuator unit is rotatably supported by the rotation support mechanism about an axis. The first inner load cell is arranged on the first seat adapter coaxially with the rotation support mechanism, and detects an axial force acting on the lower spring seat and a moment. The second inner load cell is arranged under the second seat adapter coaxially with the rotation support mechanism, and detects an axial force acting on the upper spring seat and a moment.

6 Claims, 7 Drawing Sheets

(56) References Cited

OTHER PUBLICATIONS

Nishizawa, et al., "Experiments on Influence of Coil Spring Reaction Force Axis on Vehicle Characteristics, using 'Universal Springs'", Japan Society of Spring Engineers (JSSE) 2013 Autumn Lecture Meeting, published Nov. 1, 2013, pp. 21-24.
Related U.S. Appl. No. 14/620,855, filed Feb. 12, 2015, First Named Inventor: Takahiro Nakamura, Title: "Coil Spring Modeling Apparatus and Method of the Same".
Related U.S. Appl. No. 14/620,916, filed Feb. 12, 2015, First Named Inventor: Takahiro Nakamura, Title: "Coil Spring Modeling Apparatus and Method of the Same".
International Search Report (ISR) dated Apr. 19, 2016, issued in counterpart International Application No. PCT/JP2016/054011.
Nishizawa, et al., "Development of Programmable Force Line Generator for Coil Springs", (2005), No. 50, pp. 39-46.
International Search Report (ISR) dated Aug. 18, 2016, issued in counterpart International Application No. PCT/JP2016/054011.

* cited by examiner

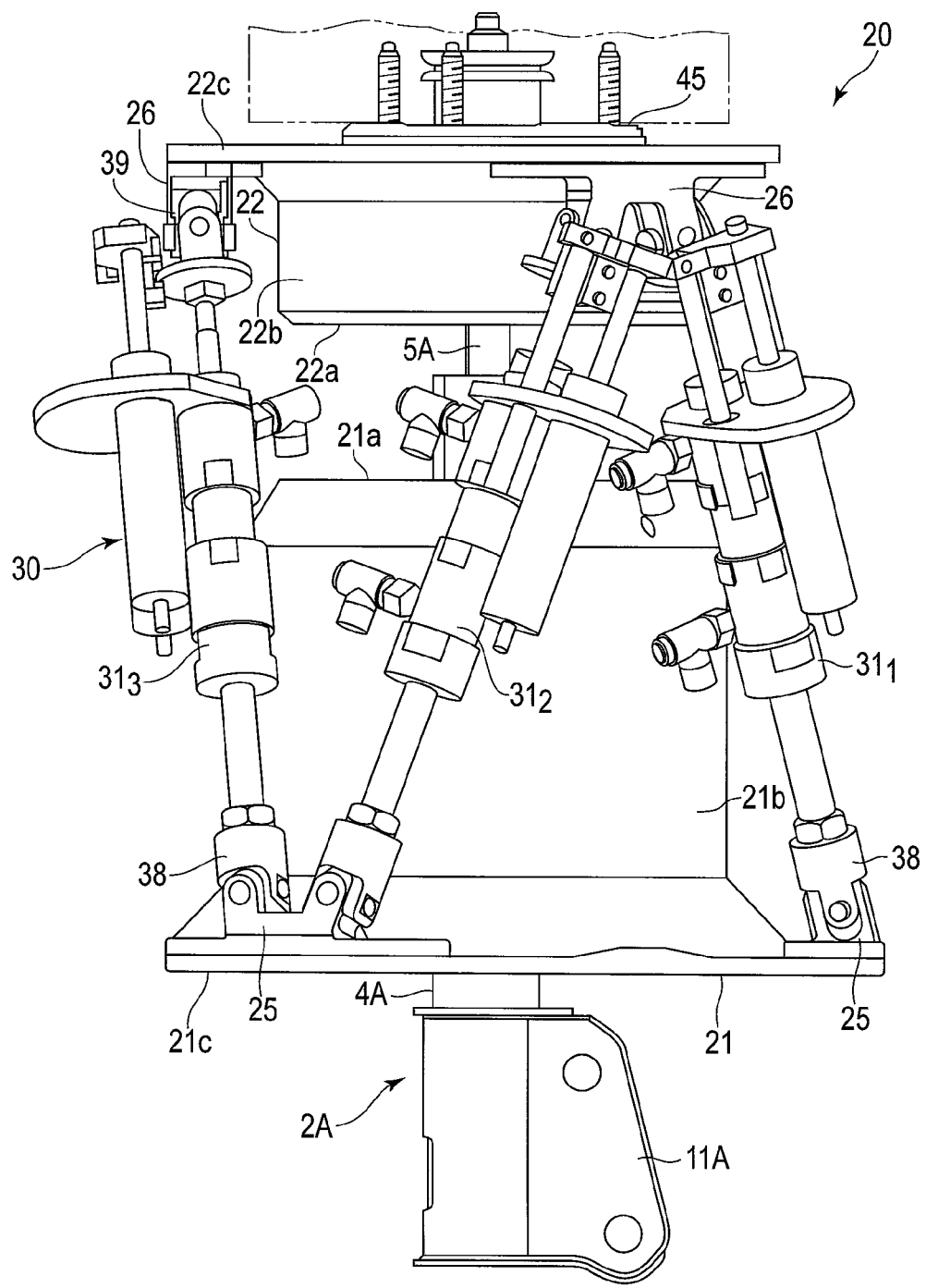
F I G. 3

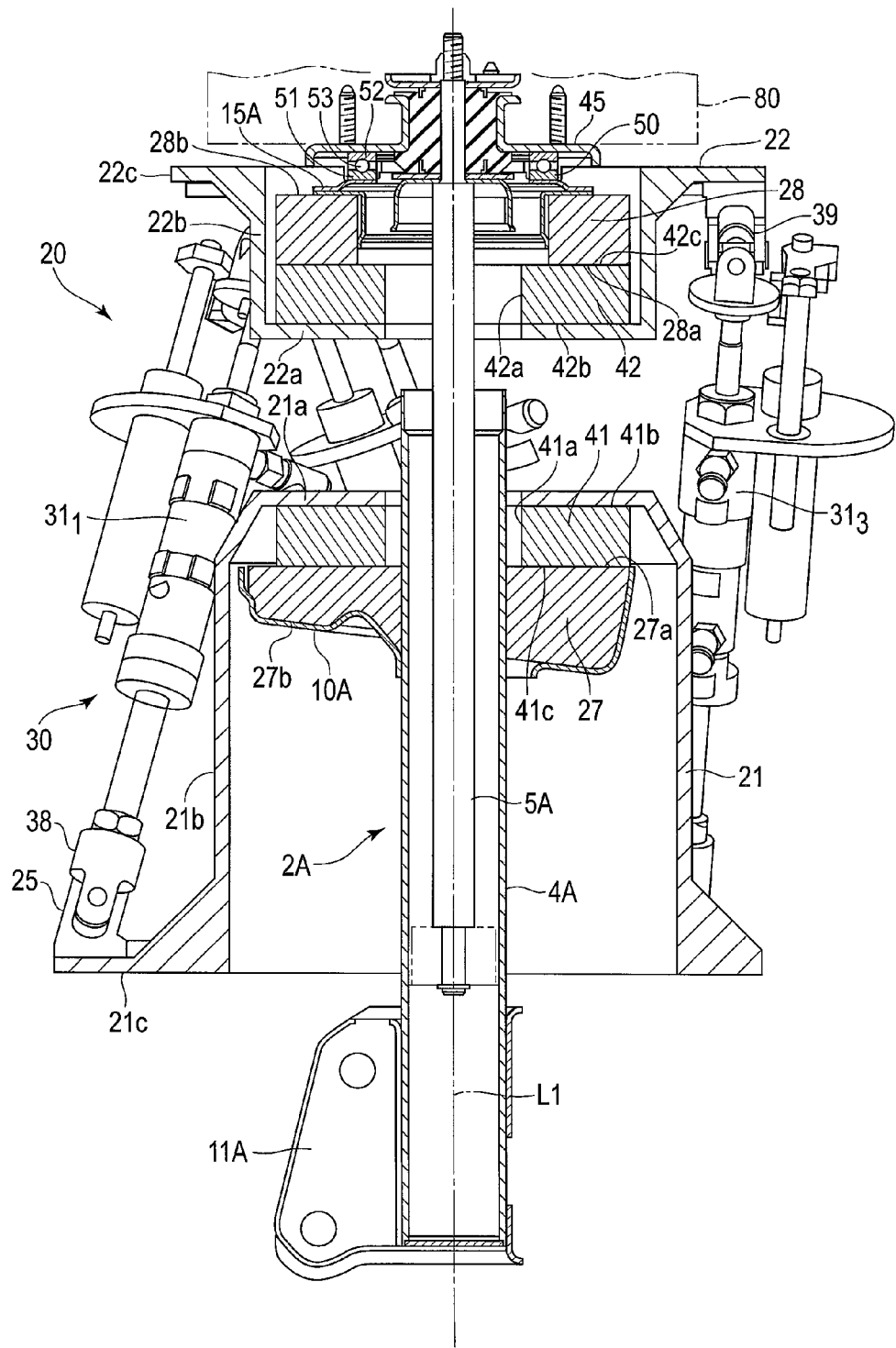
F I G. 5

COIL SPRING MODELING APPARATUS

BACKGROUND OF THE INVENTION

1. Field of the Invention

The present invention relates to a coil spring modeling apparatus capable of producing a reactive force (repulsive force) corresponding to compression of a helical spring such as a suspension coil spring.

2. Description of the Related Art

As an example of a vehicle suspension system, a McPherson-strut-type suspension is known. The McPherson-strut-type suspension comprises a coil spring, and a strut (a shock absorber) provided inside of the coil spring. The coil spring is compressed by a load applied from above the coil spring, and is extended and retracted in accordance with the load. The strut is also extended and retracted.

In the McPherson-strut-type suspension, in order to reduce the sliding resistance of a strut, offsetting a force line position (FLP) of a coil spring from the center line of the coil spring is known. For example, the force line position (FLP) of a coil spring is set at a position where the friction of the strut is minimal. For this reason, the relationship between a force line position (FLP) of a coil spring and the sliding resistance of a strut must be specified. However, producing a variety of coil springs whose force line positions are different by way of trial is time consuming and costly. Thus, instead of using the coil spring, using a coil spring modeling apparatus has been proposed.

For example, a coil spring modeling apparatus disclosed in, U.S. Pat. No. 7,606,690 (Document 1) is known. Also, an improved coil spring modeling apparatus is disclosed in "Research of Effect of Coil Spring Reaction Force Line on Vehicle Characteristics by Universal Spring" (Document 2), on pages 21 to 24 of the proceedings, presentation of which was made in the conference held by the Japan Society of Spring Engineers (in Nagoya) on Nov. 1, 2013, and "Experimental Study on the Effect of Coil Spring Reaction Force Vector on Suspension Characteristics" of SAE 2014 (Document 3), presentation of which was made in the U.S. (Detroit) on Apr. 8, 2014. The coil spring modeling apparatus disclosed in the above documents has a Stewart-platform-type parallel mechanism comprising six hydraulic cylinders. By actuating each of the hydraulic cylinders by fluid pressure, a reactive force corresponding to compression of a coil spring can be produced.

The coil spring modeling apparatus of Document 1 detects a reactive force which each of the hydraulic cylinders is subjected to by six load cells provided in the six hydraulic cylinders, respectively. The coil spring modeling apparatus disclosed in Documents 2 and 3 comprises external multi-axial load cells. By the external multi-axial load cells, friction of the strut, that is, the damper friction, is detected.

In the McPherson-strut-type suspension, when a coil spring is compressed between the lower spring seat and the upper spring seat, it is known that a relative change of rotational position is produced between the lower end turn portion and the upper end turn portion in accordance with the amount of compression. If the relative change of rotational position is restrained by friction, a moment around a kingpin axis (a kingpin moment) is produced in the suspension. The kingpin moment (KPM) becomes a factor which adversely affects the steering performance of a vehicle.

The kingpin moment (KPM) changes in accordance with a geometric positional relationship between the kingpin axis and the strut axis. Also, the kingpin moment (KPM) may sometimes be affected by a force line position (FLP). Accordingly, attempts have been made to mimic the force line position (FLP) of various coil springs and the kingpin moment (KPM) by the coil spring modeling apparatus. However, if the upper end of an actuator unit comprising a Stewart-platform-type parallel mechanism is restricted to a base member, when a torque about the axis is produced by the actuator unit, the actuator unit itself is twisted. Thus, what was conceived in the past was to produce a moment corresponding to a kingpin moment (KPM) by controlling a torque produced by the actuator unit. However, the conventional coil spring modeling apparatus leaves room for improvement in that detecting a kingpin moment (KPM) corresponding to that of the actual suspension with high accuracy is difficult.

BRIEF SUMMARY OF THE INVENTION

Accordingly, an object of the present invention is to provide a coil spring modeling apparatus which enables a kingpin moment that is produced by a coil spring of a strut-type suspension to be more accurately evaluated.

An embodiment of the present invention comprises a lower spring seat provided on a first strut element (for example, an outer tube), an upper spring seat provided at a second strut element (for example, a rod), a first attachment member disposed on the lower spring seat, a second attachment member disposed on the upper spring seat, a base member disposed above the upper spring seat, an actuator unit which is arranged between the first attachment member and the second attachment member, and extends and retracts, a rotation support mechanism, a first inner load cell, and a second inner load cell. The rotation support mechanism is arranged between the base member and the actuator unit, and rotatably supports the upper spring seat and the actuator unit with respect to the base member about an axis. The first inner load cell is arranged coaxially with the rotation support mechanism within the first attachment member, comprises a through-hole into which the first strut element is inserted, and detects an axial force applied to the lower spring seat and a moment about the axis. The second inner load cell is arranged coaxially with the rotation support mechanism within the second attachment member, comprises a through-hole into which the second strut element is inserted, and detects an axial force applied to the upper spring seat and a moment about the axis.

According to this embodiment, a force line position (FLP) corresponding to that of a coil spring of the strut-type suspension can be mimicked accurately, and a kingpin moment (KPM) corresponding to that of the actual suspension can also be mimicked based on the moment about the axis which has been produced by the actuator unit.

An example of the actuator unit comprises a Stewart-platform-type parallel mechanism including six hydraulic cylinders arranged with their inclinations changed alternately between the first attachment member and the second attachment member. In the present embodiment, a first seat adapter arranged between the lower spring seat and the first inner load cell, and a second seat adapter arranged between the upper spring seat and the second inner load cell should preferably be provided. Also, the first inner load cell has an annular shape with an upper surface and a lower surface which are parallel to each other, the second inner load cell has an annular shape with an upper surface and a lower surface which are parallel to each other, and these load cells are arranged coaxially with the rotation support mechanism.

An example of the first attachment member comprises a first disk portion having a flat surface which contacts the upper surface of the first inner load cell, a first extending portion which extends downward from the first disk portion, and a first flange portion which projects outward from the first extending portion. An example of the second attachment member comprises a second disk portion having a flat surface which contacts the lower surface of the second inner load cell, a second extending portion which extends upward from the second disk portion, and a second flange portion which projects outward from the second extending portion. A KPM detection means for detecting a kingpin moment (KPM) which is produced about a kingpin axis in a state where the lower spring seat and the upper spring seat are twisted relatively may further be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 3 is a side view of the coil spring modeling apparatus shown in FIG. 2;

FIG. 5 is a cross-sectional view taken along line F5-F5 of FIG. 4;

DETAILED DESCRIPTION OF THE INVENTION

Figure 1:
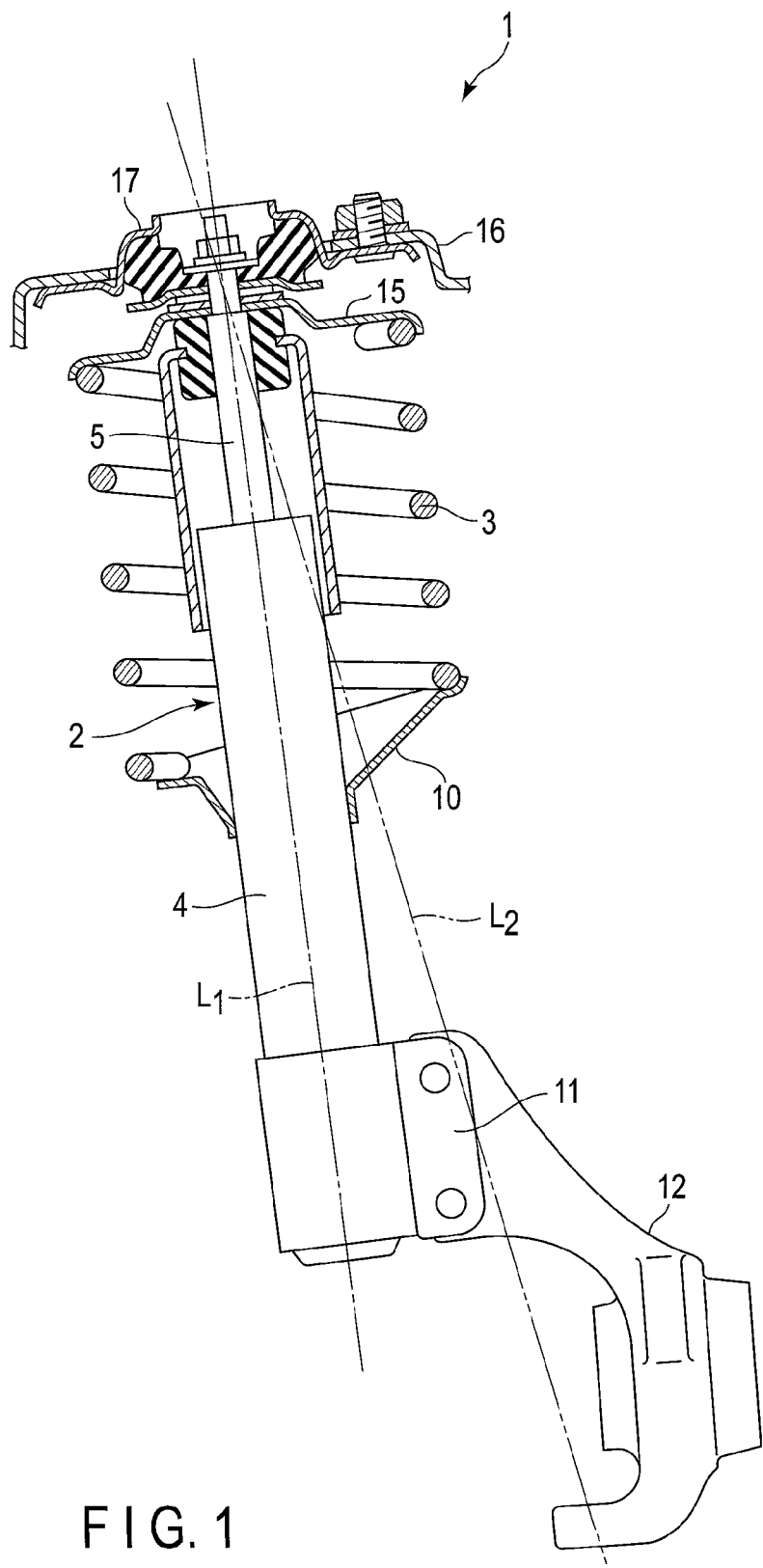
FIG. 1 is a cross-sectional view of a McPherson-strut-type suspension.

FIG. 1 shows a McPherson-strut-type suspension 1, which is an example of a suspension system used in vehicles. The suspension 1 comprises a shock absorber as a strut 2, and a suspension coil spring 3 (which is hereinafter simply referred to as a coil spring 3). The strut 2 comprises an outer tube 4 as a first strut element, and a rod 5 as a second strut element. The rod 5 is inserted into the outer tube 4. A damping force generation mechanism is provided at a distal end of the rod 5 inserted into the outer tube 4. The outer tube 4 and the rod 5 can be moved relatively along axis $L_1$ (strut axis).

The outer tube 4 is provided with a lower spring seat 10. At the lower end of the outer tube 4, a bracket 11 is provided. A knuckle member 12 is mounted on the bracket 11. A wheel axis is supported by the knuckle member 12. An upper spring seat 15 is provided near the upper end of the rod 5. A mount insulator 17 is provided between the upper spring seat 15 and a body member 16. When a steering operation is performed, the strut 2 is pivoted about kingpin axis $L_2$ by the steering control force input to the knuckle member 12. The coil spring 3 is provided in a state in which the coil spring 3 is compressed between the lower spring seat 10 and the upper spring seat 15.

Figure 2:
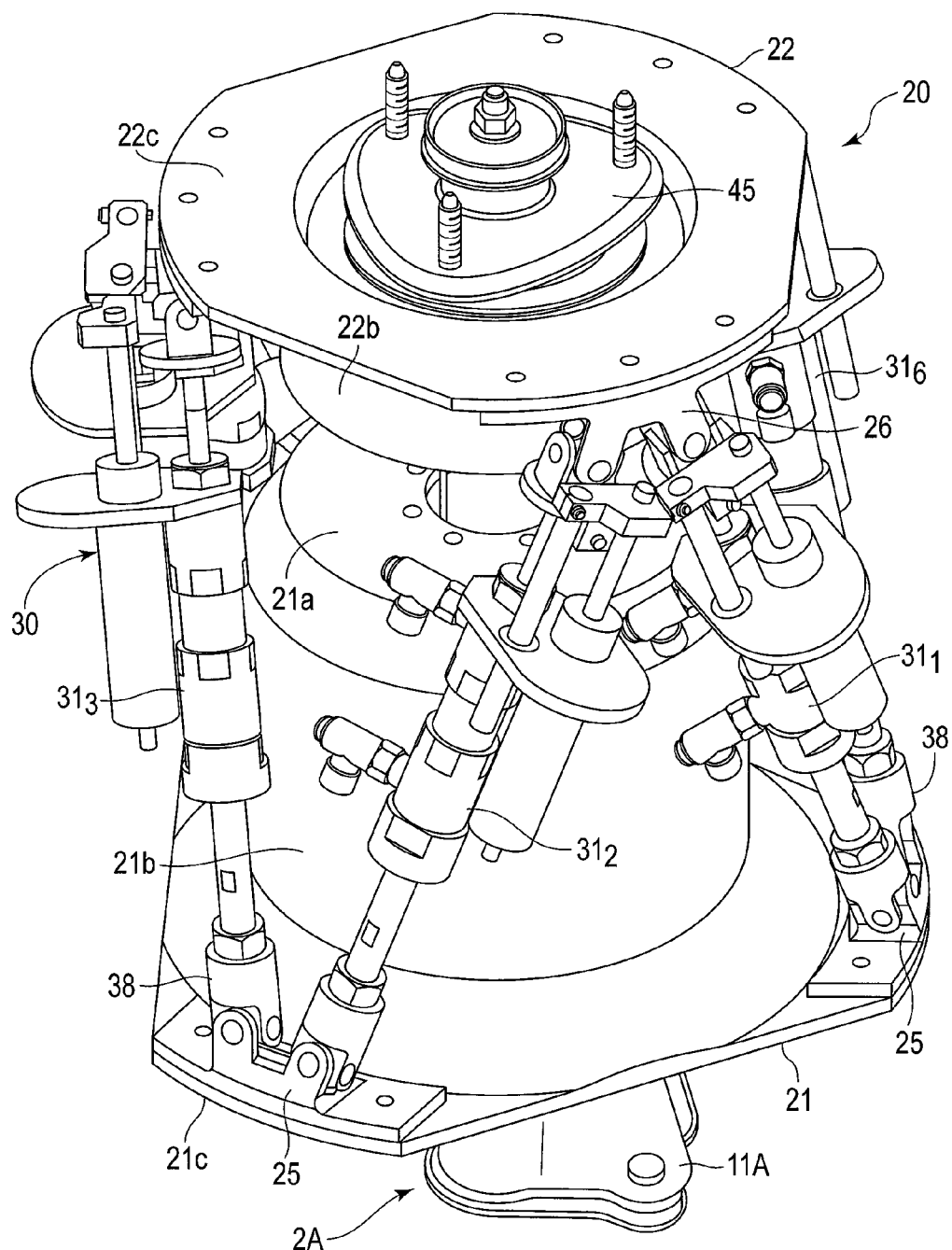
FIG. 2 is a perspective view of a coil spring modeling apparatus according to an embodiment.
Figure 4:
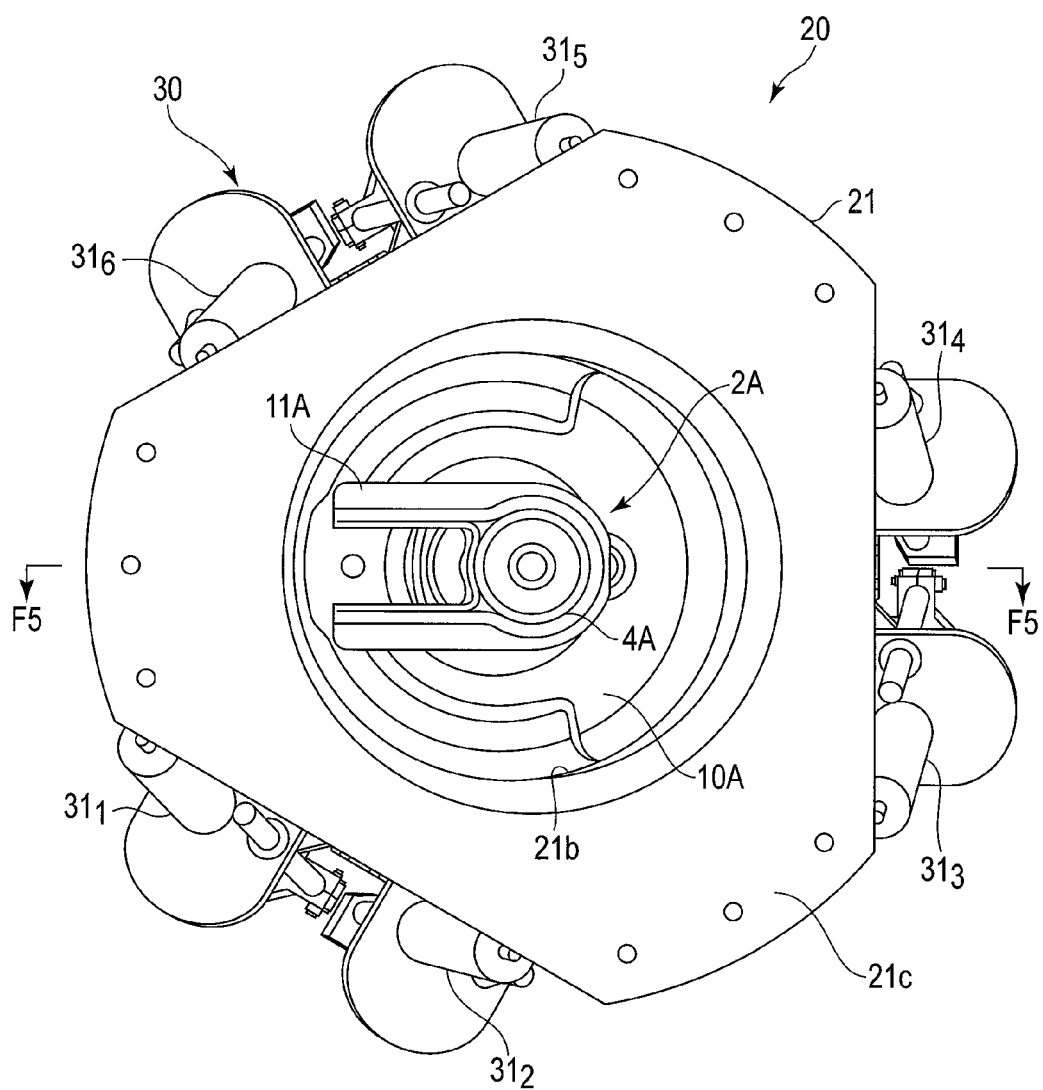
FIG. 4 is a bottom view of the coil spring modeling apparatus shown in FIG. 2.

A coil spring modeling apparatus 20 according to an embodiment will now be described with reference to FIGS. 2 to 7. FIG. 2 is a perspective view of the coil spring modeling apparatus 20. FIG. 3 is a side view of the coil spring modeling apparatus 20. FIG. 4 is a bottom view of the coil spring modeling apparatus 20. FIG. 5 is a cross-sectional view taken along line F5-F5 of FIG. 4.

A strut 2A (FIG. 5) which is used in the coil spring modeling apparatus 20 comprises an outer tube 4A as a first strut element, a rod 5A as a second strut element, a lower spring seat 10A, a bracket 11A, and an upper spring seat 15A. The lower spring seat 10A is attached to the outer tube 4A. The upper spring seat 15A is disposed near the upper end of the rod 5A above the lower spring seat 10A. The rod 5A can be moved along axis $L_1$ (strut axis) relative to the outer tube 4A.

The coil spring modeling apparatus 20 comprises a first attachment member 21, a second attachment member 22, a first seat adapter 27, a second seat adapter 28, an actuator unit 30 comprising a Stewart-platform-type parallel mechanism, a first inner load cell 41, a second inner load cell 42, a base member 45, a rotation support mechanism 50, etc.

The first attachment member 21 is secured to the lower spring seat 10A. The first attachment member 21 comprises a first disk portion 21a disposed above the lower spring seat 10A, a first extending portion 21b having a cylindrical shape which extends downward from the first disk portion 21a, and a first flange portion 21c projecting outward from the lower end of the first extending portion 21b. That is, the first attachment member 21 is substantially shaped like a hat. A lower joint connection portion 25 is circumferentially provided at each of six places in the first flange portion 21c.

The second attachment member 22 is secured to the upper spring seat 15A. The second attachment member 22 comprises a second disk portion 22a disposed below the upper spring seat 15A, a second extending portion 22b having a cylindrical shape which extends upward from the second disk portion 22a, and a second flange portion 22c projecting outward from the upper end of the second extending portion 22b. That is, the second attachment member 22 is shaped like an upside-down hat. An upper joint connection portion 26 is circumferentially provided at each of six places in the second flange portion 22c.

The first seat adapter 27 is arranged on the lower spring seat 10A. The first seat adapter 27 is formed of a light alloy whose specific gravity is smaller than that of iron such as aluminum alloy, and has a flat upper surface 27a. A lower surface 27b of the first seat adapter 27 has a shape which fits into the lower spring seat 10A.

The second seat adapter 28 is arranged under the upper spring seat 15A. The second seat adapter 28 is also formed of a light alloy such as aluminum alloy, and has a flat lower surface 28a. An upper surface 28b of the second seat adapter 28 has the shape which contacts the upper spring seat 15A. The lower surface 28a of the second seat adapter 28 is parallel to the lower surface 27b of the first seat adapter 27.

The flange portion 21c of the first attachment member 21 is positioned below the lower spring seat 10A. The flange portion 22c of the second attachment member 22 is positioned above the upper spring seat 15A. The actuator unit 30 which extends and retracts by fluid pressure is arranged between these flange portions 21c and 22c. An example of the actuator unit 30 comprises a Stewart-platform-type parallel mechanism.

Figure 6:
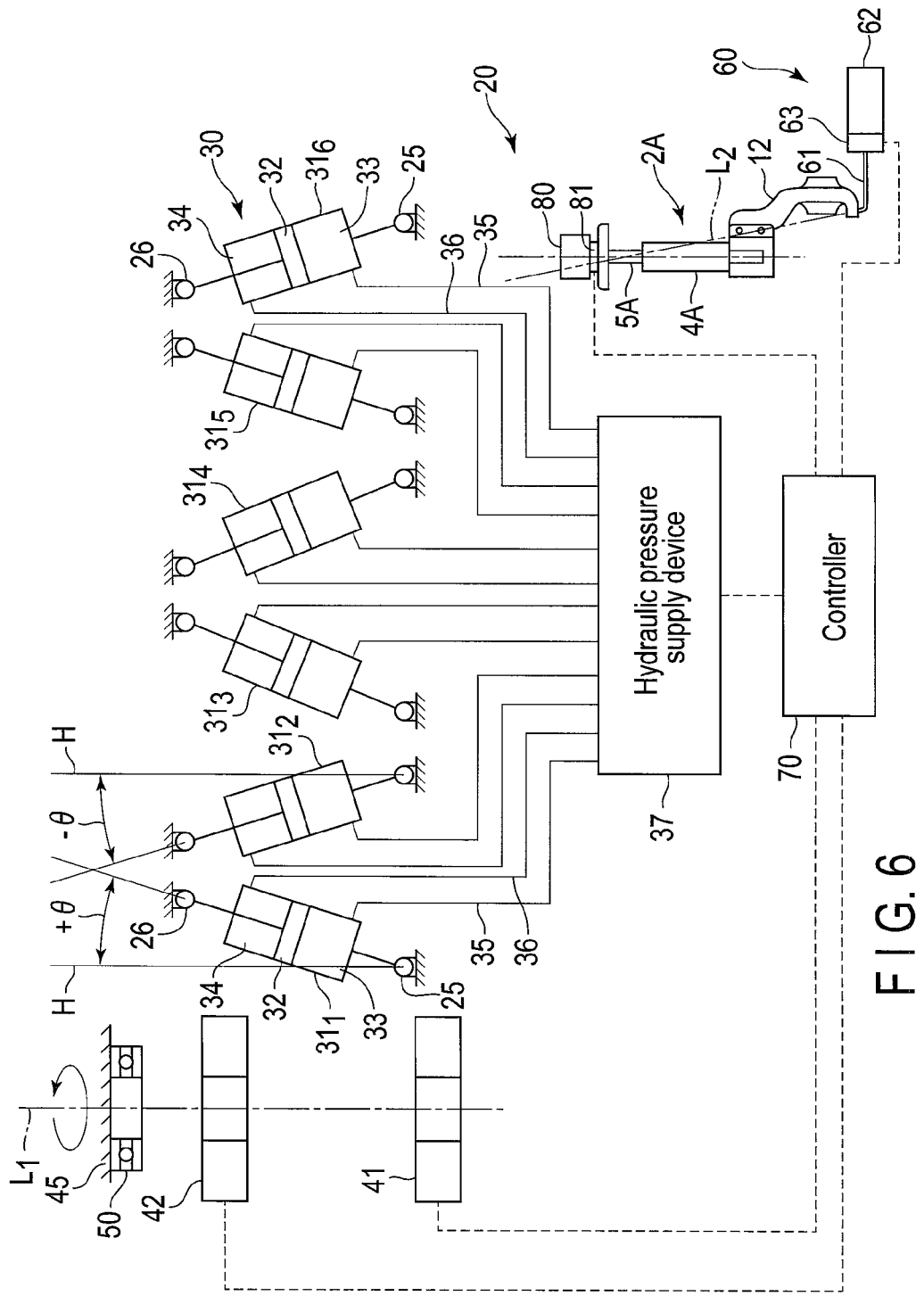
FIG. 6 is a block diagram showing a schematic structure of the coil spring modeling apparatus shown in FIG. 2.
Figure 7:
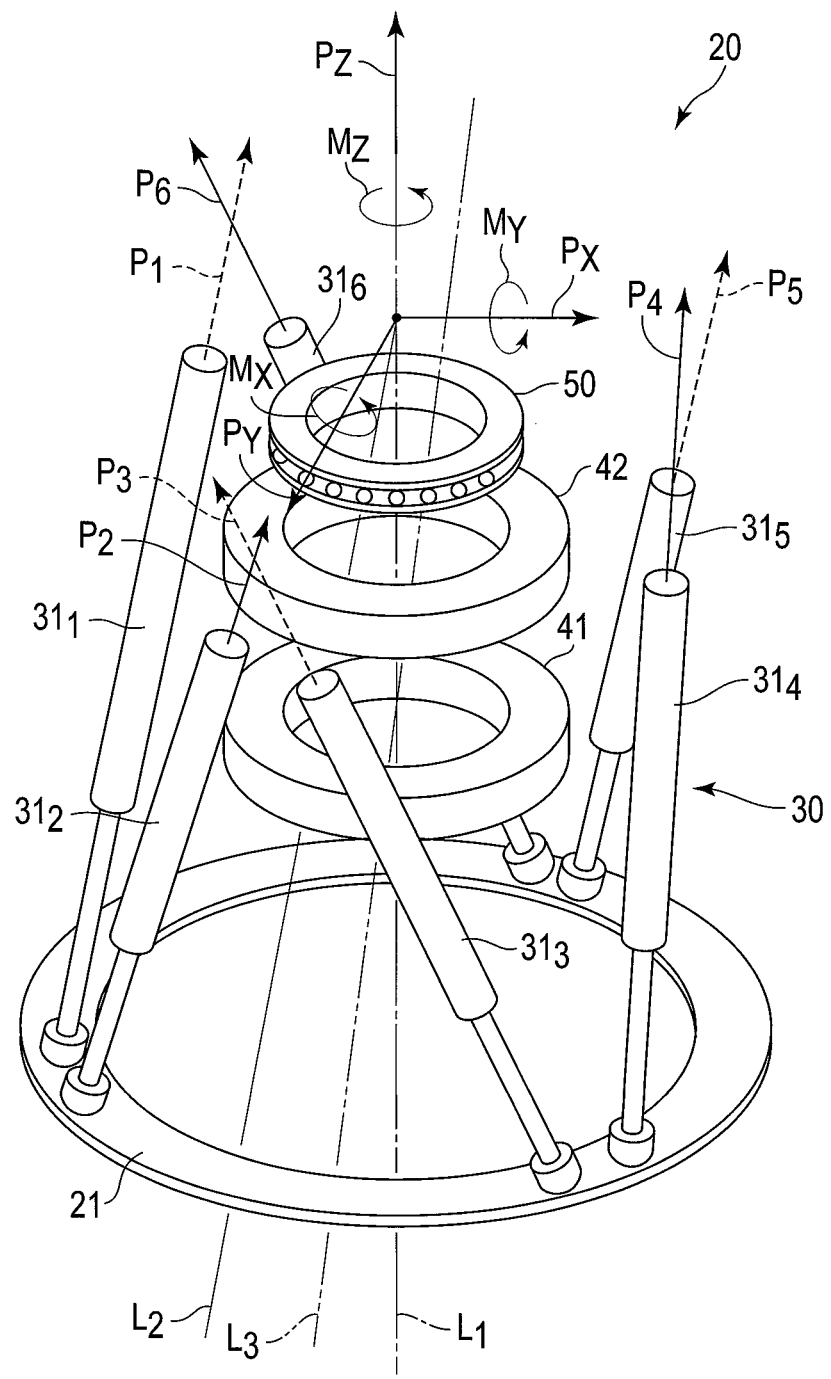
FIG. 7 is a perspective view schematically showing a part of the coil spring modeling apparatus shown in FIG. 2.

FIG. 6 is a block diagram showing the structure of the coil spring modeling apparatus 20. FIG. 7 is a perspective view which schematically shows a part of the coil spring modeling apparatus 20. The actuator unit 30 comprising the Stewart-platform-type parallel mechanism includes six hydraulic cylinders $31_1$ to $31_6$. These hydraulic cylinders $31_1$ to $31_6$ are arranged such that their inclinations are changed alternately, that is, the angles of adjacent hydraulic cylinders with respect to vertical line H (FIG. 6) are respectively $+\theta$ and $-\theta$ in turn.

Since the structures of the six hydraulic cylinders $31_1$ to $31_6$ are common to each other, the first hydraulic cylinder $31_1$ will be described as a typical example of the hydraulic cylinders. The hydraulic cylinder $31_1$ comprises a piston rod 32 actuated by fluid pressure (for example, oil pressure), a first hydraulic chamber 33 which moves the piston rod 32 in a first direction (the extending side), and a second hydraulic chamber 34 which moves the piston rod 32 in a second direction (the retracting side). The first hydraulic chamber 33 and the second hydraulic chamber 34 are connected to a hydraulic pressure supply device 37 via hoses 35 and 36, respectively.

The hydraulic cylinder $31_1$ can be moved to the extending side or the retracting side by supplying fluid pressure produced by the hydraulic pressure supply device 37 to the first hydraulic chamber 33 or the second hydraulic chamber 34. The lower end of the hydraulic cylinder $31_1$ is swingably connected to the joint connection portion 25 of the first attachment member 21 by a universal joint 38 typified by a ball joint. The upper end of the hydraulic cylinder $31_1$ is swingably connected to the joint connection portion 26 of the second attachment member 22 by a universal joint 39 typified by a ball joint.

The first inner load cell 41 is arranged between the disk portion 21a of the first attachment member 21 and the first seat adapter 27. The first inner load cell 41 is accommodated within the first attachment member 21, and is disposed above the lower spring seat 10A. The first inner load cell 41 comprises a through-hole 41a into which the outer tube 4A is inserted, a flat upper surface 41b which contacts a lower surface of the first disk portion 21a, and a flat lower surface 41c which contacts the upper surface 27a of the first seat adapter 27, and has an annular shape as a whole. The first inner load cell 41 is secured to the first seat adapter 27 such that the upper surface 41b and the lower surface 41c of the first inner load cell 41 are perpendicular to axis $L_1$.

The first inner load cell 41 is arranged coaxially with the rotation support mechanism 50, that is, the center of the inner load cell 41 conforms to axis $L_1$. The first inner load cell 41 detects the axial force acting on the upper surface 27a of the first seat adapter 27, and a moment about the axis. The first inner load cell 41 can rotate about axis $L_1$ together with the outer tube 4A, the lower spring seat 10A, the first seat adapter 27, and the first attachment member 21.

The second inner load cell 42 is arranged between the disk portion 22a of the second attachment member 22 and the second seat adapter 28. The second inner load cell 42 is accommodated within the second attachment member 22, and is disposed below the upper spring seat 15A. The second inner load cell 42 comprises a through-hole 42a into which the rod 5A is inserted, a flat lower surface 42b which contacts an upper surface of the second disk portion 22a, and a flat upper surface 42c which contacts the lower surface 28a of the second seat adapter 28, and has an annular shape as a whole. The second inner load cell 42 is secured to the second seat adapter 28 such that the lower surface 42b and the upper surface 42c of the second inner load cell 42 are perpendicular to axis $L_1$.

Like the first inner load cell 41, the second inner load cell 42 is arranged coaxially with the rotation support mechanism 50, that is, the center of the inner load cell 42 conforms to axis $L_1$. The second inner load cell 42 detects the axial force acting on the lower surface 28a of the second seat adapter 28, and a moment about the axis. The second inner load cell 42 can rotate about axis $L_1$ together with the upper spring seat 15A, the second attachment member 22, and the second seat adapter 28.

The rotation support mechanism 50 is disposed between the upper spring seat 15A and the base member 45. The rotation support mechanism 50 rotatably supports the actuator unit 30 about axis $L_1$ with respect to the base member 45. An example of the rotation support mechanism 50 is a ball bearing, and the rotation support mechanism 50 comprises a lower ring member 51, an upper ring member 52, and a plurality of rolling members 53 accommodated between these ring members 51 and 52. The lower ring member 51 is disposed on an upper surface of the upper spring seat 15A. The upper ring member 52 is disposed on a lower surface of the base member 45.

As an example of detection means for detecting a kingpin moment (KPM), the coil spring modeling apparatus 20 comprises a push-pull testing unit 60 (FIG. 6) as KPM detection means. The push-pull testing unit 60 comprises a linear actuator 62 configured to push and pull a tie rod 61, and a load cell 63 which measures the axial force applied to the tie rod 61. The tie rod 61 is connected to the knuckle member 12. When a torque (a kingpin moment) about kingpin axis $L_2$ is applied to the knuckle member 12, the magnitude of torque is detected by the push-pull testing unit 60.

The operation of the coil spring modeling apparatus 20 will now be described.

The actuator unit 30 comprising the Stewart-platform-type parallel mechanism forms a field of arbitrary force of six degrees of freedom by combining axial forces $P_1$ to $P_6$ shown in FIG. 7. That is, of vectors of force produced by six hydraulic cylinders $31_1$ to $31_6$, a resultant of components along axis $L_1$ constitutes a reactive force corresponding to that of a coil spring. For example, if a value obtained by combining the six axial forces $P_1$ to $P_6$ is positive, an upward force $P_Z$ along axis $L_1$ is produced.

When the actuator unit 30 is compressed between the lower spring seat 10A and the upper spring seat 15A, of vectors of force produced by the six hydraulic cylinders $31_1$ to $31_6$, an axial force is applied to the lower spring seat 10A. In this case, three orthogonal axial forces ($P_X$, $P_Y$, $P_Z$) with respect to the coordinate system of FIG. 7, and three moments ($M_X$, $M_Y$, $M_Z$) are produced. A six-component force ($P_X$, $P_Y$, $P_Z$, $M_X$, $M_Y$, $M_Z$) applied to the lower spring seat 10A is detected by the first inner load cell 41 and input to a controller 70 (FIG. 6). Further, a six-component force applied to the upper spring seat 15A is detected by the second inner load cell 42 and input to the controller 70. Based on these six-component forces, reactive force central position (load axis) $L_3$ is calculated.

Also, a total of moments that the six axial forces $P_1$ to $P_6$ have an effect on around axis $L_1$ constitutes moment $M_Z$ about axis $L_1$. For example, in FIG. 7, if the total of forces produced by three hydraulic cylinders $31_1$, $31_3$, and $31_5$ (i.e., the axial forces that produce the positive moment $M_Z$) is greater than the total of forces of the other three hydraulic cylinders $31_2$, $31_4$, and $31_6$ (i.e., the axial forces that produce the negative moment $M_Z$), moment $M_Z$ having a positive value is produced at an upper end of the actuator unit 30 (the upper spring seat 15A). That is, components around the axes of vectors of forces produced by the six hydraulic cylinders $31_1$ to $31_6$ correspond to the moment ($M_Z$) about axis $L_1$. Also at kingpin axis $L_2$, a moment (a kingpin moment) about kingpin axis $L_2$ is produced by the effect of the six-component force. Accordingly, it is possible to measure the moment about kingpin axis $L_2$ while changing the six-component force by the actuator unit 30.

A performance test of the strut 2A (for example, measurement of the sliding resistance of the strut 2A and the kingpin moment) can be performed by using the coil spring modeling apparatus 20 of the present embodiment. FIGS. 5 and 6 show reference number 80, which represents a part of a load testing machine. A predetermined load is applied to the coil spring modeling apparatus 20 by the load testing machine. Since the distance between the lower spring seat 10A and the upper spring seat 15A is reduced by the load, a vertical reaction is produced. While this vertical reaction is being produced, the base member 45 is moved vertically with, for example, vertical strokes of ±5 mm, and a rectangular waveform of 0.5 Hz, and the load is measured by an external load cell 81. The frictional force produced in the strut 2A can be evaluated as a half of the value of hysteresis of the measured load.

When a moment ($M_Z$) about axis $L_1$ is produced between the lower spring seat 10A and the upper spring seat 15A by controlling the fluid pressure supplied to each of the hydraulic cylinders $31_1$ to $31_6$, a kingpin moment is produced in accordance with a geometric positional relationship between axis $L_1$ and kingpin axis $L_2$. The actuator unit 30 is supported by the rotation support mechanism 50. The friction of the rotation support mechanism 50 affects the magnitude of the kingpin moment (KPM). In a state where a predetermined vertical reaction is produced between the lower spring seat 10A and the upper spring seat 15A, a kingpin moment (KPM) is detected by the push-pull testing unit 60 (FIG. 6). For example, the knuckle member 12 is pivoted clockwise and anticlockwise alternately by the linear actuator 62, and the axial force applied to the tie rod 61 is detected by the load cell 63. Further, based on a difference between the axial force for pivoting the knuckle member 12 clockwise and the axial force for pivoting the same anticlockwise, the kingpin moment is calculated. However, the kingpin moment may be detected by a KPM detection means other than the above.

The coil spring modeling apparatus 20 of the present embodiment comprises the first inner load cell 41 and the second inner load cell 42 which are arranged coaxially with the rotation support mechanism 50. Further, the actuator unit 30 comprising the Stewart-platform-type parallel mechanism is rotatably supported by the rotation support mechanism 50. Because the kingpin moment (KPM) is affected by the friction of the rotation support mechanism 50, if the actuator unit 30 is restricted to the base member 45, it is hard to mimic a kingpin moment corresponding to that of a suspension. In the present embodiment, since the actuator unit 30 is rotatably supported at the base member 45 by the rotation support mechanism 50, a kingpin moment corresponding to that of the actual suspension can be detected with high accuracy.

The coil spring modeling apparatus 20 of the present embodiment can detect an axial force and a moment about the axis acting between the lower spring seat 10A and the upper spring seat 15A with high accuracy by the inner load cells 41 and 42 arranged coaxially with the rotation support mechanism 50. Further, since the seat adapters 27 and 28 are used, the spring seats 10A and 15A which are equivalent to the spring seats of the actual suspension can be used. Accordingly, a force line position (FLP) corresponding to that of the actual coil spring can be mimicked accurately, and a kingpin moment (KPM) can also be detected.

It should be noted that the coil spring modeling apparatus according to the embodiment of the present invention can be applied to other types of suspension system having a strut, i.e., suspension systems other than the McPherson-strut-type suspension. The actuator unit is not limited to the Stewart-platform-type parallel mechanism, and any actuator unit comprising a hydraulic or pneumatic cylinder which extends and retracts by pressure of a fluid (liquid or gas) may be adopted. As other examples of the actuator unit, a linear actuator including a ball screw and a servo motor, or a differential-transformer-type linear actuator may be adopted. Further, needless to say, the structure, form, and arrangement or the like of each of the elements which constitutes the coil spring modeling apparatus, such as the first and second attachment members, the first and second inner load cells, the rotation support mechanism, the first and second seat adapters, the KPM detection means, etc., may be modified variously in implementing the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A coil spring modeling apparatus provided on a strut comprising a first strut element and a second strut element which are movable relatively along an axis, the coil spring modeling apparatus comprising:
    a lower spring seat provided on the first strut element;
    an upper spring seat arranged above the lower spring seat;
    a first attachment member disposed on the lower spring seat;
    a second attachment member disposed on the upper spring seat;
    a base member disposed above the upper spring seat;
    an actuator unit which is arranged between the first attachment member and the second attachment member, and extends and retracts;
    a rotation support mechanism which is arranged between the base member and the actuator unit, and configured to rotatably support the upper spring seat and the actuator unit with respect to the base member about the axis;
    a first inner load cell which is arranged coaxially with the rotation support mechanism within the first attachment member, comprises a through-hole into which the first strut element is inserted, and is configured to detect an axial force applied to the lower spring seat and a moment about the axis; and
    a second inner load cell which is arranged coaxially with the rotation support mechanism within the second attachment member, comprises a through-hole into which the second strut element is inserted, and is configured to detect an axial force applied to the upper spring seat and a moment about the axis.

2. The apparatus of claim 1, wherein the actuator unit comprises a Stewart-platform-type parallel mechanism including six hydraulic cylinders arranged with their inclinations changed alternately between the first attachment member and the second attachment member.

3. The apparatus of claim 2, further comprising a first seat adapter arranged between the lower spring seat and the first inner load cell, and a second seat adapter arranged between the upper spring seat and the second inner load cell.

4. The apparatus of claim 3, wherein the first inner load cell has an annular shape with an upper surface and a lower surface which are parallel to each other, and the second inner load cell has an annular shape with an upper surface and a lower surface which are parallel to each other.

5. The apparatus of claim 4, wherein
the first attachment member comprises a first disk portion having a flat surface which contacts the upper surface of the first inner load cell, a first extending portion which extends downward from the first disk portion, and a first flange portion which projects outward from the first extending portion, and
the second attachment member comprises a second disk portion having a flat surface which contacts the lower surface of the second inner load cell, a second extending portion which extends upward from the second disk portion, and a second flange portion which projects outward from the second extending portion.

6. The apparatus of claim 1, further comprising a KPM detection means for detecting a kingpin moment which is produced about a kingpin axis in a state where the lower spring seat and the upper spring seat are twisted relatively.

\* \* \* \* \*